(12) United States Patent
Taha et al.

(10) Patent No.: US 11,296,523 B2
(45) Date of Patent: Apr. 5, 2022

(54) HOUSING FOR RETAINING AND CHARGING PORTABLE CHARGERS

(71) Applicant: FLI Charge, LLC, Lake Forest, IL (US)

(72) Inventors: Sameh Taha, Lake Forest, IL (US); Craig Leahy, Lake Forest, IL (US); James Byun, Lake Forest, IL (US)

(73) Assignee: FLI Charge, LLC, Lake Forest, IL (US)

( * ) Notice: Subject to any disclaimer, the term of this patent is extended or adjusted under 35 U.S.C. 154(b) by 159 days.

(21) Appl. No.: 16/726,625

(22) Filed: Dec. 24, 2019

(65) Prior Publication Data

US 2021/0194257 A1 Jun. 24, 2021

(51) Int. Cl.
*H01M 10/46* (2006.01)
*H02J 7/00* (2006.01)
*H02J 7/02* (2016.01)

(52) U.S. Cl.
CPC .......... *H02J 7/0044* (2013.01); *H02J 7/0013* (2013.01); *H02J 7/02* (2013.01)

(58) Field of Classification Search
CPC .......... H02J 7/0044; H02J 7/0013; H02J 7/02
USPC .................................. 320/107, 108, 114, 116
See application file for complete search history.

(56) References Cited

U.S. PATENT DOCUMENTS

| | | | |
|---|---|---|---|
| 2006/0087282 A1* | 4/2006 | Baarman | H02J 50/10 320/108 |
| 2009/0106567 A1* | 4/2009 | Baarman | H02J 50/90 713/300 |
| 2011/0127959 A1* | 6/2011 | McGary | H02J 7/0027 320/114 |
| 2017/0163057 A1* | 6/2017 | Maggert | H02J 7/0044 |
| 2018/0262030 A1* | 9/2018 | Zadvinskis | H02J 50/10 |

OTHER PUBLICATIONS

<https://www.globalindustrial.com/p/office/computer-furniture/laptop-storage-charging/32-chromebook-8482-laptop-tablet-charging-cart?infoParam.campaignId=T9F&gclid=EAIaIQobChMIn7uqItvF5gIVw8DACh1fwgAKEAQYASABEgLTPD BwE>, pp. 1-3 (Dec. 21, 2019).

* cited by examiner

*Primary Examiner* — Edward Tso
(74) *Attorney, Agent, or Firm* — Honigman LLP (57) ABSTRACT

A housing for portable chargers includes a frame, at least one retaining member, and a charging pad. The frame defines a plurality of components configured to receive a plurality of portable chargers. The at least one retaining member is attached to the frame and configured to retain the plurality of portable chargers in the plurality of compartments. The charging pad extends into the plurality of compartments and is configured to charge the plurality of portable chargers.

17 Claims, 10 Drawing Sheets

HOUSING FOR RETAINING AND CHARGING PORTABLE CHARGERS

FIELD

The present disclosure relates generally to housings for portable chargers.

BACKGROUND

This section provides background information related to the present disclosure which is not necessarily prior art.

Portable chargers, also referred to as power banks, may include a rechargeable battery that can be used to charge an electronic device. Common power banks require charging of the battery using a cable that plugs into an AC power receptacle and into the power bank to transfer power from the AC power receptacle to the rechargeable battery. However, use of such a cable can be inconvenient and cumbersome, especially in instances where multiple power banks are being recharged. Further, storage of the power banks may be inconvenient and cumbersome, especially in instances where multiple power banks are being stored.

SUMMARY

This section provides a general summary of the disclosure, and is not a comprehensive disclosure of its full scope or all of its features.

One aspect of the disclosure provides housing for portable chargers. The housing includes a frame, at least one retaining member, and a charging pad. The frame defines a plurality of compartments configured to receive a plurality of portable chargers. The at least one retaining member is attached to the frame and configured to retain the plurality of portable chargers in the plurality of compartments. The charging pad extends into the plurality of compartments and is configured to charge the plurality of portable chargers.

Implementations of the disclosure may include one or more of the following optional features. In some implementations, the charging pad is configured to charge the plurality of portable chargers via conductive wireless charging.

In some implementations, at least one retaining member includes a plurality of flexible tabs extending into the plurality of compartments and configured to flex relative to the frame.

In some implementations, the at least one retaining member includes at least one rod extending along a length of the frame.

In some implementations, the frame includes a top portion, a bottom portion spaced from the top portion, and a plurality of dividing walls between the top portion and the bottom portion to define the plurality of compartments.

In some implementations, the frame includes a plurality of slots configured to receive a plurality of electronic devices. The plurality of electronic devices may include at least one of a smartphone, a laptop computer, a tablet computer, or a personal digital assistant.

Another aspect of the disclosure provides a housing for portable chargers. The housing includes a frame and a charging pad. The frame includes a top portion, a bottom portion spaced from the top portion, and a plurality of dividing walls between the top portion and the bottom portion to define a plurality of compartments. The plurality of compartments is configured to receive a plurality of portable chargers. The charging pad is disposed at the bottom portion and in each compartment of the plurality of compartments. The charging pad is configured to charge the plurality of portable chargers.

This aspect may include one or more of the following optional features. In some implementations, the charging pad is configured to charge the plurality of portable chargers via conductive wireless charging.

In some implementations, the housing includes a plurality of flexible retaining tabs extending into the plurality of compartments and configured to flex relative to the frame.

In some implementations, the housing includes at least one retaining rod extending along a length of the frame.

In some implementations, the frame includes a plurality of slots configured to receive a plurality of electronic devices. The plurality of electronic devices may include at least one of a smartphone, a laptop computer, a tablet computer, or a personal digital assistant.

A further aspect of the disclosure provides a housing configured to simultaneously retain and charge a plurality of portable chargers. The housing includes a frame and a charging pad. The frame defines a plurality of compartments and a plurality of slots. The plurality of compartments is configured to receive a plurality of portable chargers. The plurality of slots is configured to receive a plurality of electronic devices. The charging pad extends into the plurality of compartments and is configured to charge the plurality of portable chargers.

This aspect may include one or more of the following optional features. In some implementations, the charging pad is configured to charge the plurality of portable chargers via conductive wireless charging.

In some implementations, the housing includes a plurality of flexible retaining tabs extending into the plurality of compartments and configured to flex relative to the frame.

In some implementations, the housing includes at least one retaining rod extending along a length of the frame.

In some implementations, the frame includes a top portion, a bottom portion spaced from the top portion, and a plurality of dividing walls between the top portion and the bottom portion to define the plurality of compartments. The plurality of slots may extend from the top portion of the frame in a direction substantially perpendicular to a length of the frame.

In some implementations, the plurality of electronic devices includes at least one of a smartphone, a laptop computer, a tablet computer, or a personal digital assistant.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected configurations and not all possible implementations, and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms first, second, third, etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

Figure 1A:
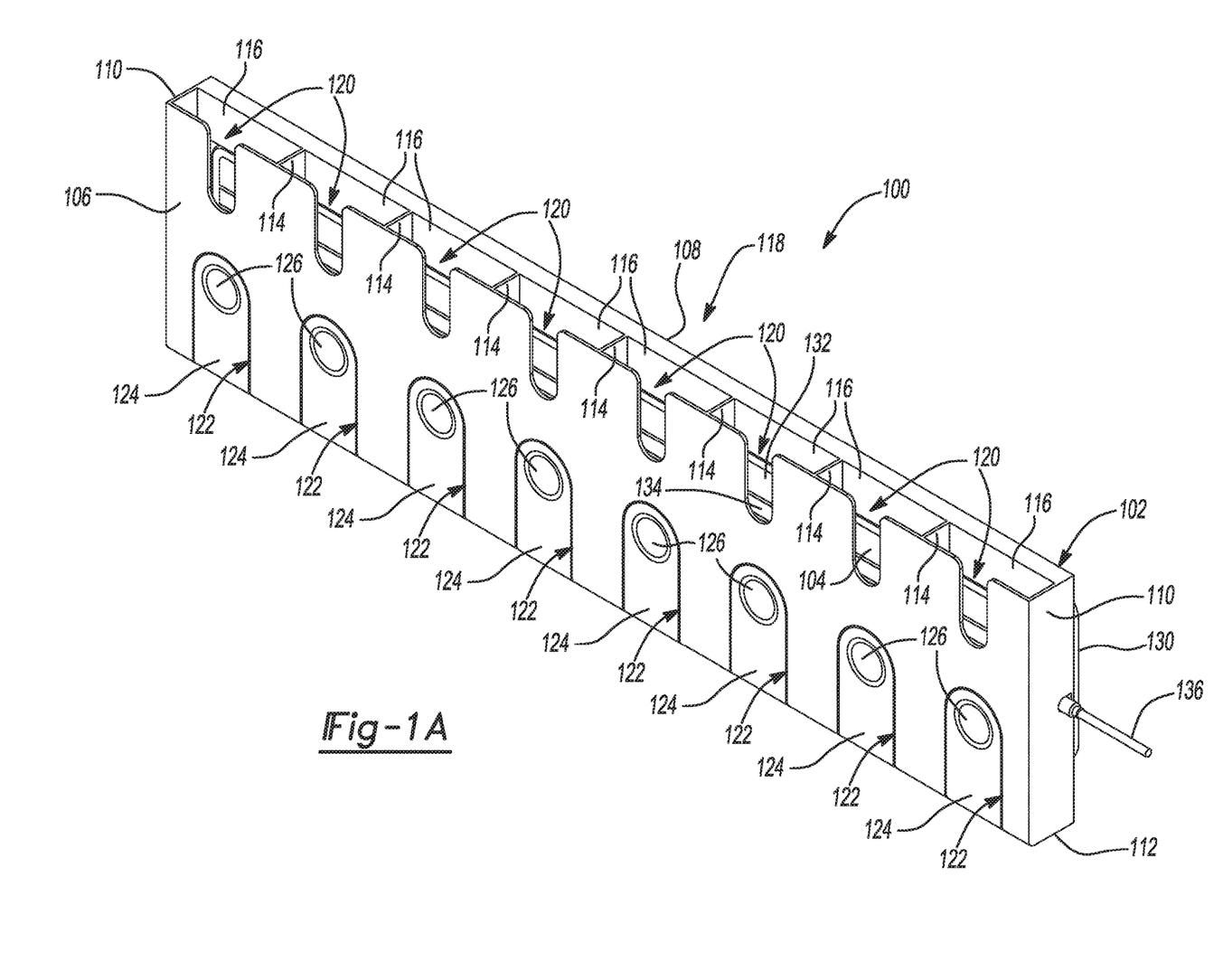
FIG. 1A is a top perspective view of an exemplary housing for portable chargers in accordance with the principles of the present disclosure.
Figure 1B:
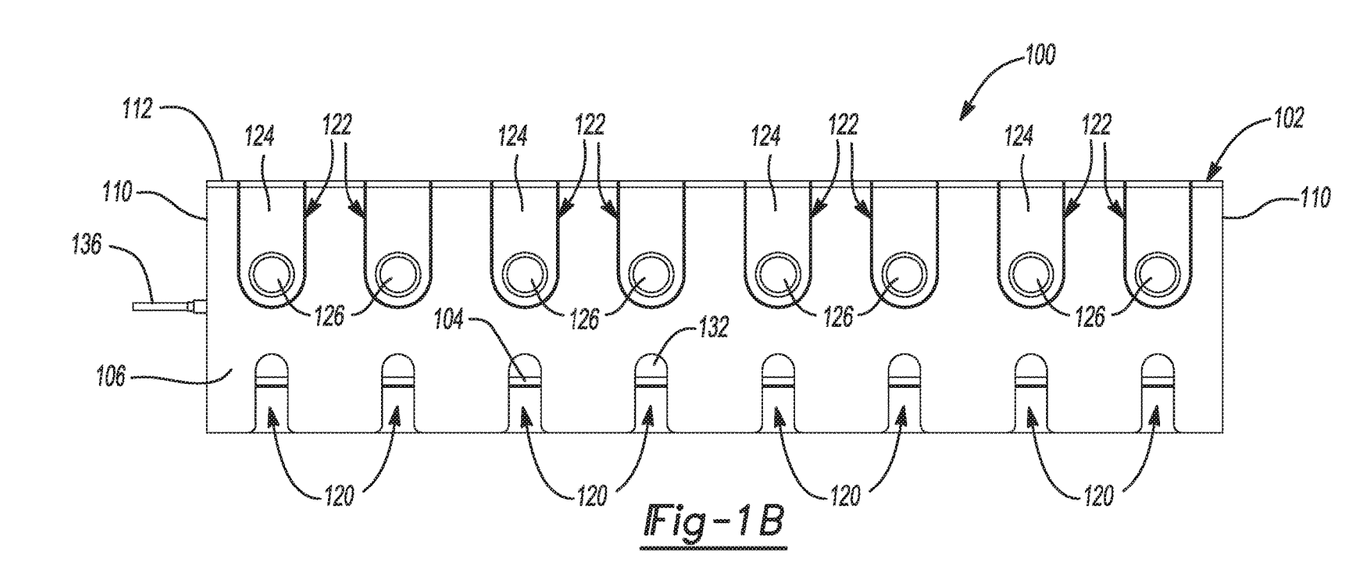
FIG. 1B is a top elevation view of the housing of FIG. 1A.

Referring to FIG. 1A, a housing 100 for portable chargers, also referred to as power banks, is generally shown. The housing 100 includes a frame 102 and a charging pad 104. The housing 100 may facilitate simultaneous retention (i.e., storage) and charging of power banks, such as the power banks 150 shown in FIGS. 3 and 5, with the frame 102 receiving the power banks 150, and the charging pad 104 charging the power banks 150 via wireless electrical (e.g., conductive, inductive, etc.) charging. For example, if multiple power banks need to be charged, it may be cumbersome and inconvenient to store and charge these multiple power banks using a separate power cable for each power bank. By the frame 102 providing designated storage locations for each of the power banks 150 and the charging pad 104 being capable of providing wireless electrical power and charging the power banks 150, i.e., without the use of separate power cables, the housing 100 may conveniently and effectively store and charge the power banks 150.

Referring to FIGS. 1A-3, the frame 102 includes a top portion 106, a bottom portion 108 spaced from the top portion 106, a pair of side walls 110 extending between the top portion 106 and the bottom portion 108, and a back wall 112 extending between the top portion 106 and the bottom portion 108. In some implementations, as shown in the figures, the frame 102 may have a generally rectangular shape. In other implementations, the frame 102 may have any suitable shape. The frame 102 may include a plurality of dividing walls 114 extending between the top portion 106 and the bottom portion 108. The dividing walls 114 may be substantially parallel to the pair of side walls 110. In other implementations, the dividing walls 114 may extend at any suitable angle relative to the side walls 110, e.g., to correspond to the shape of the power banks.

The top portion 106, the bottom portion 108, the side walls 110, the back wall 112, and the dividing walls 114 may cooperate to define a plurality of compartments 116. For example, one of the compartments 116 may be defined by the top portion 106, the bottom portion 108, one of the side walls 110, the back wall 112, and one of the dividing walls 114. As another example, one of the compartments 116 may be defined by the top portion 106, the bottom portion 108, the back wall 112, one of the dividing walls 114, and another of the dividing walls 114. While FIG. 1A illustrates the frame 102 as including eight compartments 116, it should be understood that the frame 102 may include any suitable number of compartments 116.

Figure 3:
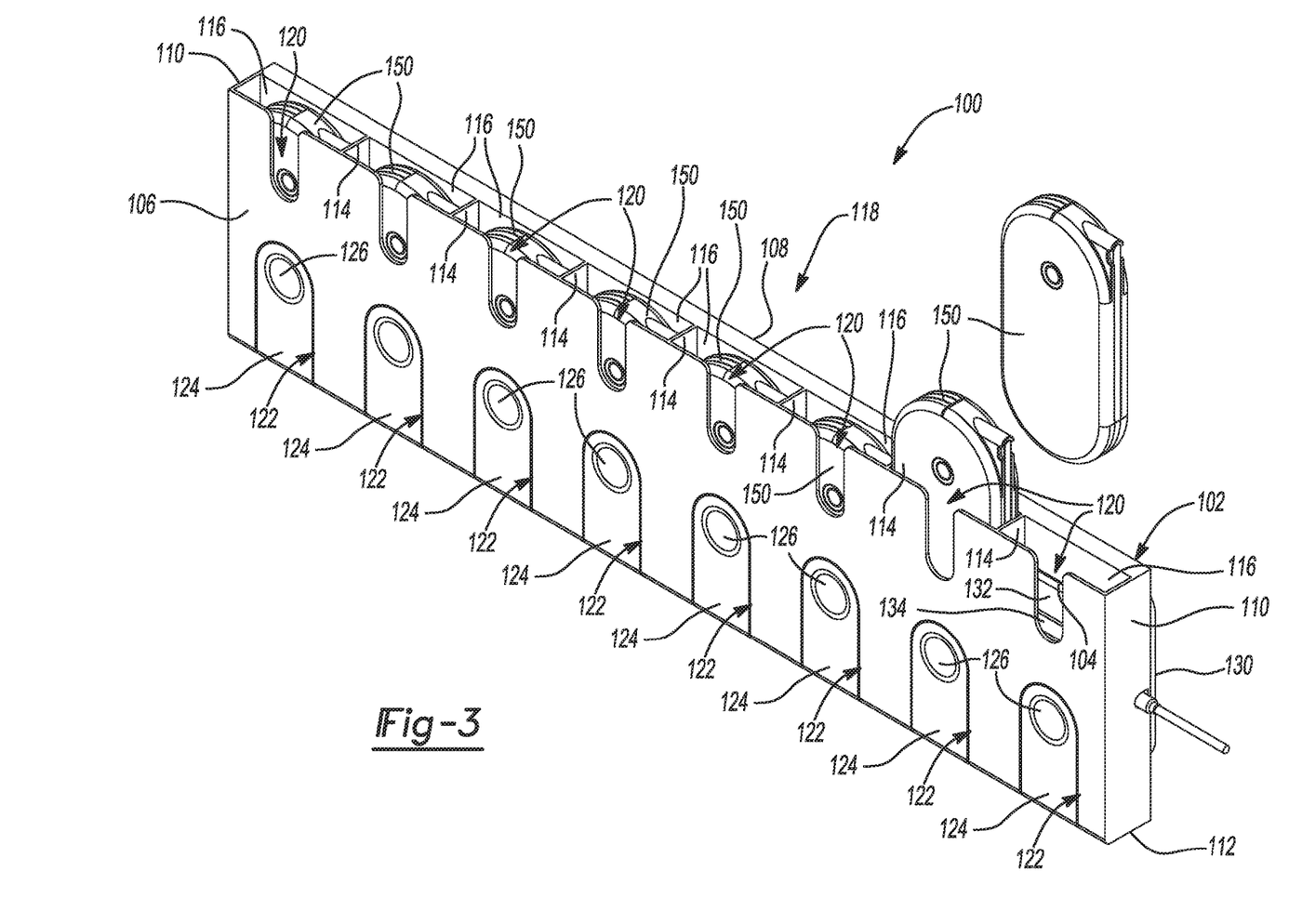
FIG. 3 is a partially exploded perspective view of the housing of FIG. 1A and a plurality of exemplary chargers received by the housing.

The compartments 116 may be open at a front portion 118 of the frame 102, as can be seen in FIG. 1A. For example, the compartments 116 may be cavities with the side walls 110 and the dividing walls 114 each extending continuously from the front portion 118 to the back wall 112. In other embodiments, the side walls 110 and the dividing walls 114 may extend toward the back wall 112 but may terminate before contacting the back wall 112. The compartments 116 being open at the front portion 118 of the frame 102 may allow the compartments 116 to receive a plurality of power banks, e.g., the power banks 150, as shown in FIG. 3.

The top portion 106 of the frame 102 may include a plurality of first cutouts 120 at or near the front portion 118 such that the compartments 116 are exposed at the top portion 106. The first cutouts 120 may facilitate depositing and withdrawing of the power banks 150 from the compartments 116. The top portion 106 of the frame 102 may include a plurality of second cutouts 122 at or near the back wall 112 to define at least one retaining member 124 which may be attached to or integrally formed with the frame 102. The at least one retaining member 124 may include a plurality of retaining members 124, which may include flexible tabs configured to flex relative to the frame 102. For example, the second cutouts 122 may define a plurality of apertures in the top portion 106 of the frame 102, and the retaining members 124 may be subsequently attached to the frame 102 within the apertures so the retaining members 124 may flex relative to the top portion 106 of the frame 102. As another example, the at least one retaining member 124 may be integrally formed with the frame 102 as part of the top portion 106 and/or the back wall 112, with the second cutouts 122 simply removing thin segments of the top portion 106 to allow the retaining members 124 to flex relative to the top portion 106 of the frame 102.

Figure 1C:
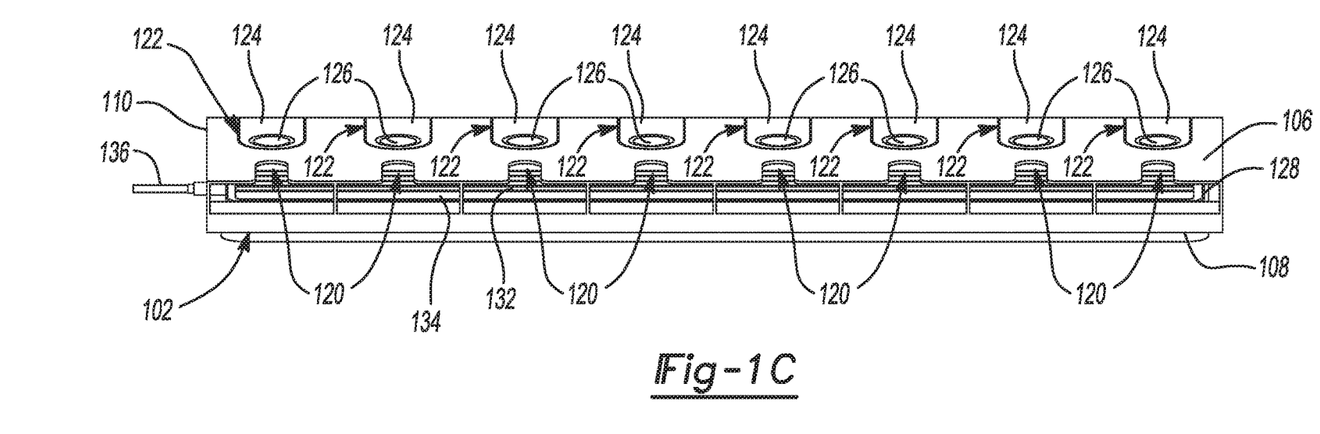
FIG. 1C is a front perspective view of the housing of FIG. 1A.
Figure 1D:
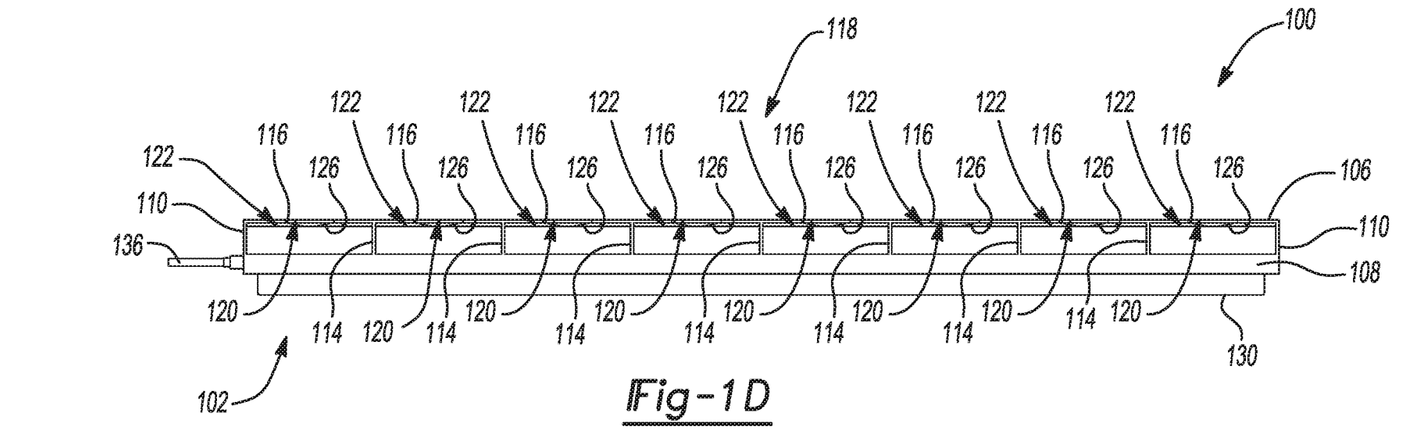
FIG. 1D is a front plan view of the housing of FIG. 1A

In some implementations, as shown in FIG. 1D, the retaining members 124 may each include a protrusion 126 extending into the compartments 116. The protrusions 126 may engage, i.e., abut against or contact, the power banks 150 to retain the power banks 150 within the compartments 116. For example, the retaining members 124 may be biased toward an unflexed position where the protrusions 126 extend into the compartments 116. Continuing with the example, when the power banks 150 are inserted into the compartments 116, as shown in FIG. 3, the power banks 150 may exert a force upon the retaining members 124 to flex the retaining members to a flexed position with the protrusions 126 pressing against the power banks 150. In some implementations, the power banks 150 include a corresponding recession configured to receive the protrusions 126, such that the protrusions retain or effectively lock the power banks 150 within the compartments 116. In other implementations, the retaining members 124 may each include a magnet to magnetically retain the power banks 150 within the compartments 116.

Figure 1E:
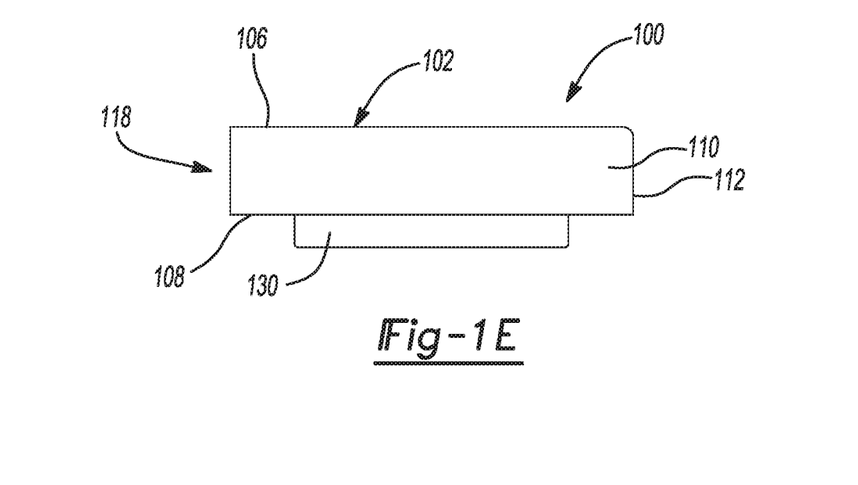
FIG. 1E is a side plan view of the housing of FIG. 1A.

Referring to FIGS. 1C-1E, in some implementations, the bottom portion 108 of the frame 102 may include an aperture 128 (FIG. 1C) configured to receive at least a portion of the charging pad 104. For example, the aperture 128 may extend along a majority of the length of the bottom portion 108 and the charging pad 104 may extend partially through the aperture 128 and into the compartments 116. In other implementations, the bottom portion 108 may be a unitary component without the aperture 128 and the charging pad 104 may be disposed within the compartments 116, e.g., entirely between the top portion 106 and the bottom portion 108. The frame 102 may be configured to be mounted on a wall, a tabletop, or any other suitable surface. For example, the frame 102, e.g., the bottom portion 108, may include fixtures and/or fasteners to secure the frame 102 to a suitable surface. The frame 102 may be positioned with the front portion 118 facing toward the right or left such that the power banks 150 do not fall out of the compartments 116 due to gravity.

Figure 2:
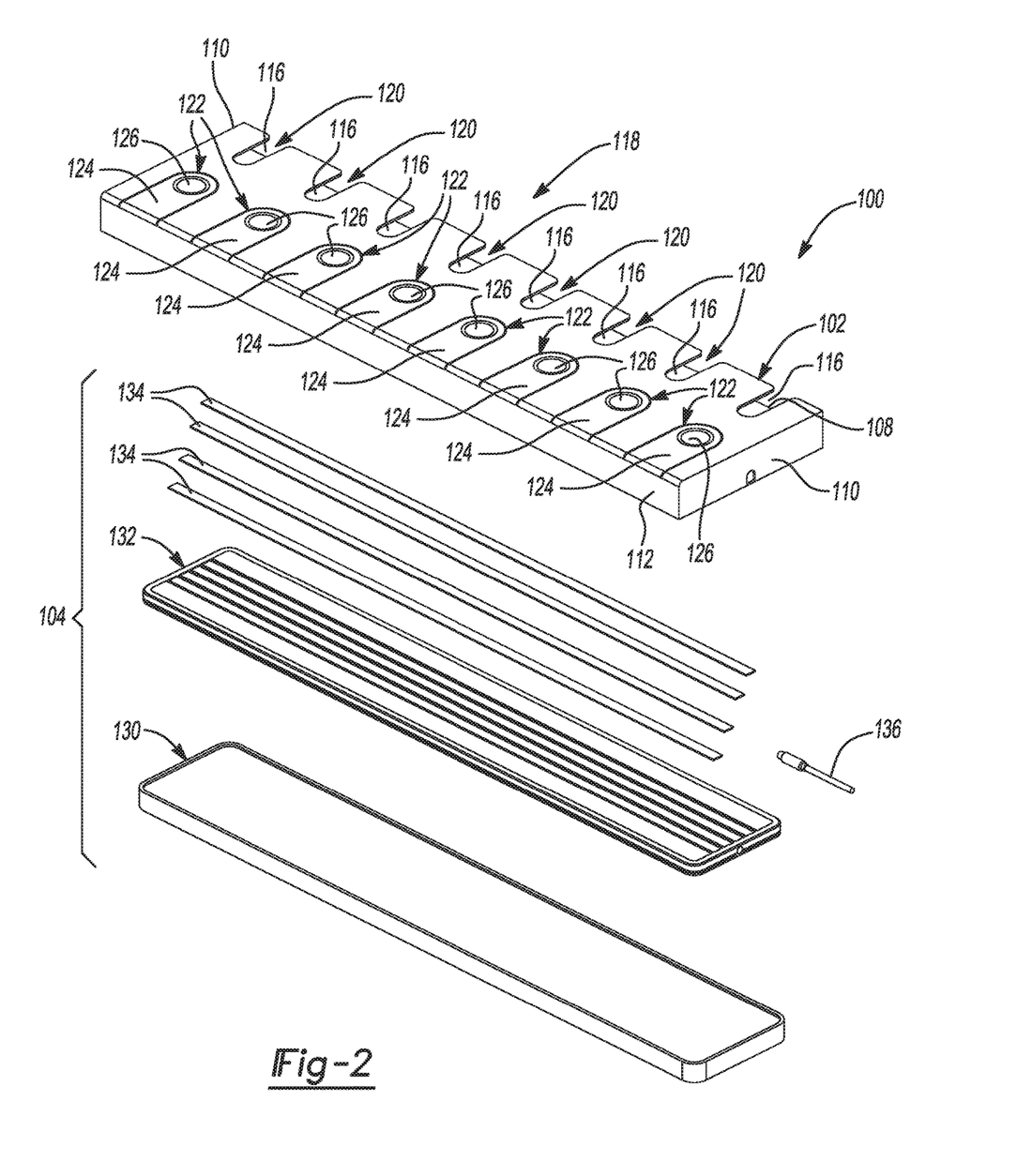
FIG. 2 is an exploded perspective view of the housing of FIG. 1A.

Referring to FIG. 2, the charging pad 104 includes a base 130, a charging surface 132 disposed within the base 130, a plurality of contact strips 134 disposed within the charging surface 132, and a power cable 136 connected to the charging surface 132. The charging pad 104 may be configured to charge the power banks 150 via conductive wireless charging and may be referred to as a wireless charging pad. For example, the power banks 150 may include a surface or other suitable device configured to receive electrical energy from the charging pad 104, such that, when the power banks 150 are properly positioned on the charging pad 104, electrical energy is transferred from an AC power receptacle, through the power cable 136, through the contact strips 134, and into the power banks 150 to charge the power banks 150.

As set forth above, the charging pad 104 may be disposed within the compartments 116 along a length of the frame 102. In some implementations, the charging pad 104 may extend continuously along the length of the frame 102 through each of the compartments 116. In other implementations, the charging pad 104 may include a plurality of charging pads 104 that are each disposed in one of the corresponding compartments 116. The power banks configured to be charged by the charging pad 104, e.g., the power banks 150, may be substantially similar to the power banks described in commonly-owned U.S. patent application Ser. No. 15/995,897 filed on Jun. 1, 2018, which is hereby incorporated by reference in its entirety.

Figure 4:
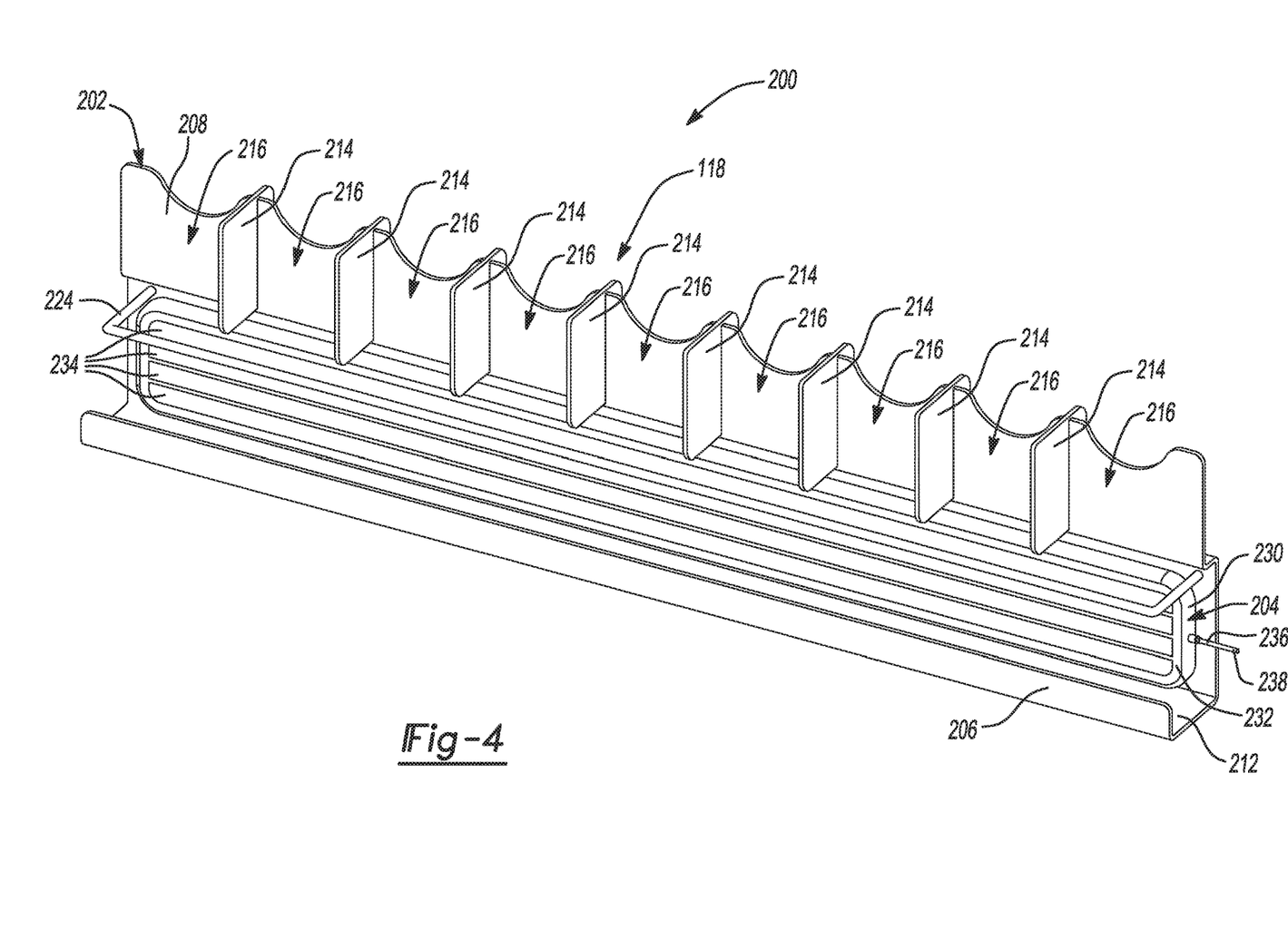
FIG. 4 is a top perspective view of another exemplary housing for portable chargers in accordance with the principles of the present disclosure.
Figure 5:
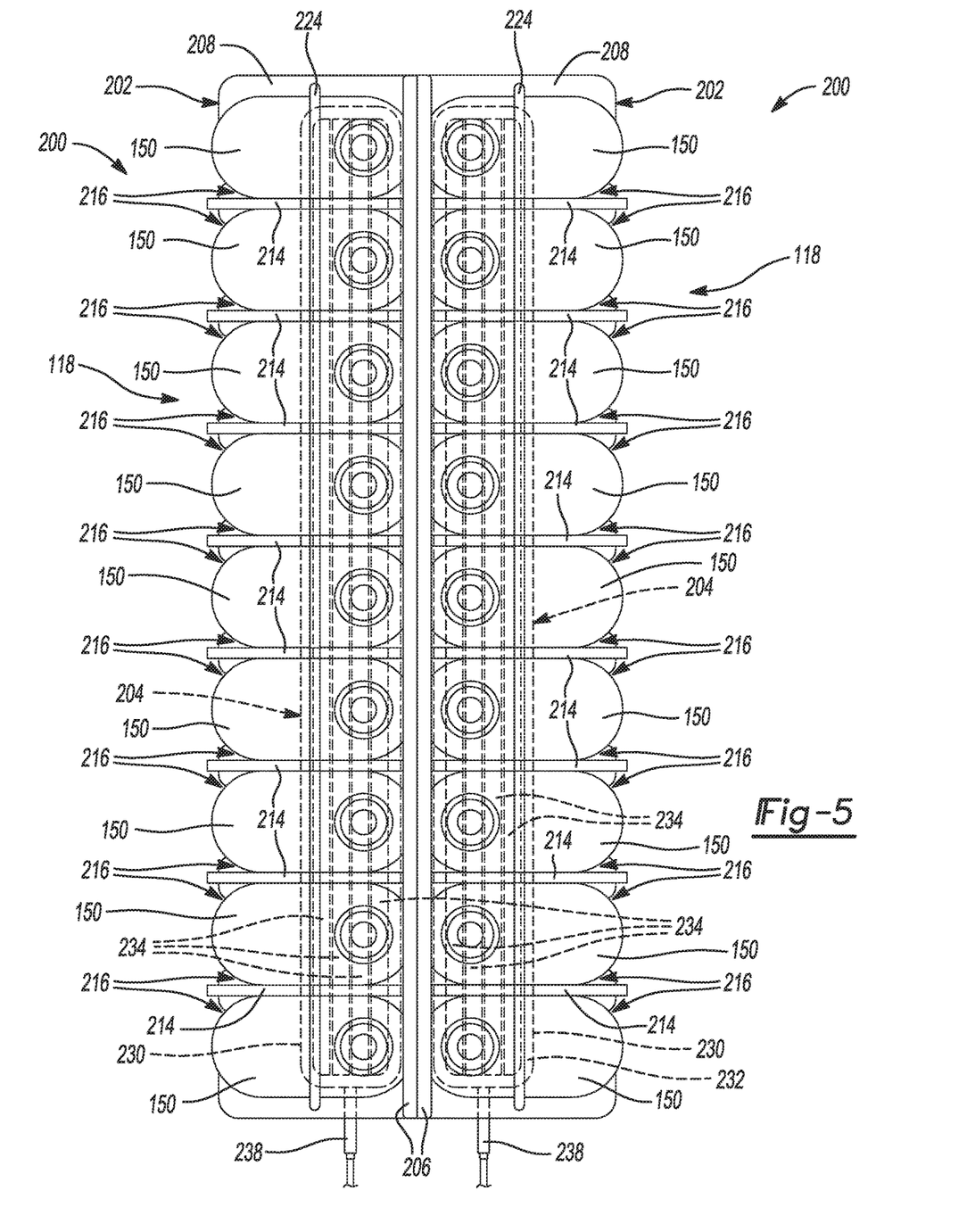
FIG. 5 is a top elevation view of two of the housings of FIG. 4 and a plurality of exemplary chargers received by the housings.

With reference to FIGS. 4 and 5, another housing 200 for portable power banks is shown. The structure and function of the housing 200 may be substantially similar to that of the housing 100, apart from any exceptions described below and/or shown in the Figures. Accordingly, the structure and/or function of similar features will not be described again in detail. In addition, like reference numerals are used hereinafter and in the drawings to identify like features with the first numeral of each reference numeral being a "2" rather than a "1" (e.g., frame 202 compared to frame 102).

As shown in FIG. 4, the top portion 206 of the frame 202 may not extend entirely to the front portion 218 from the back wall 212 and, instead, may resemble a lip or step. The dividing walls 214 may similarly not extend entirely to the back wall 112 from the front portion 218 and may instead terminate before reaching the back wall 112. The bottom portion 208 may include a stepped or indented portion 238 to receive the charging pad 204. For example, a thickness of the charging pad 204 may be substantially equal to a depth of the indented portion 238 such that the bottom portion 208 is substantially flush with the charging pad 204. In some implementations, the frame 202 may not include any side walls, or, in other implementations, the frame 202 may include any suitable side walls.

The retaining member 224 of the housing 200 may include a cylindrical rod extending along a length of the frame 102 to retain the power banks 150 within the compartments 216. Additionally or alternatively, the retaining member 224 may include at least one magnet that is configured to magnetically retain the power banks 150 within the compartments 216. In some implementations, the retaining member 224 may include protrusions to aid in retaining the power banks 150 within the compartments 216.

Referring to FIG. 5, there may be two housings 200 with the back walls 112 of each housing 200 abutting one another. In some implementations, the back walls 112 of each housing 200 are secured to one another. The two housings 200 may be substantially similar to one another and may be configured to receive and charge the power banks 150.

With reference to FIGS. 6A-6D, another housing 300 for portable power banks is shown. The structure and function of the housing 300 may be substantially similar to that of the housing 100, apart from any exceptions described below and/or shown in the Figures. Accordingly, the structure and/or function of similar features will not be described again in detail. In addition, like reference numerals are used hereinafter and in the drawings to identify like features with the first numeral of each reference numeral being a "3" rather than a "1" (e.g., frame 302 compared to frame 102).

Figure 6A:
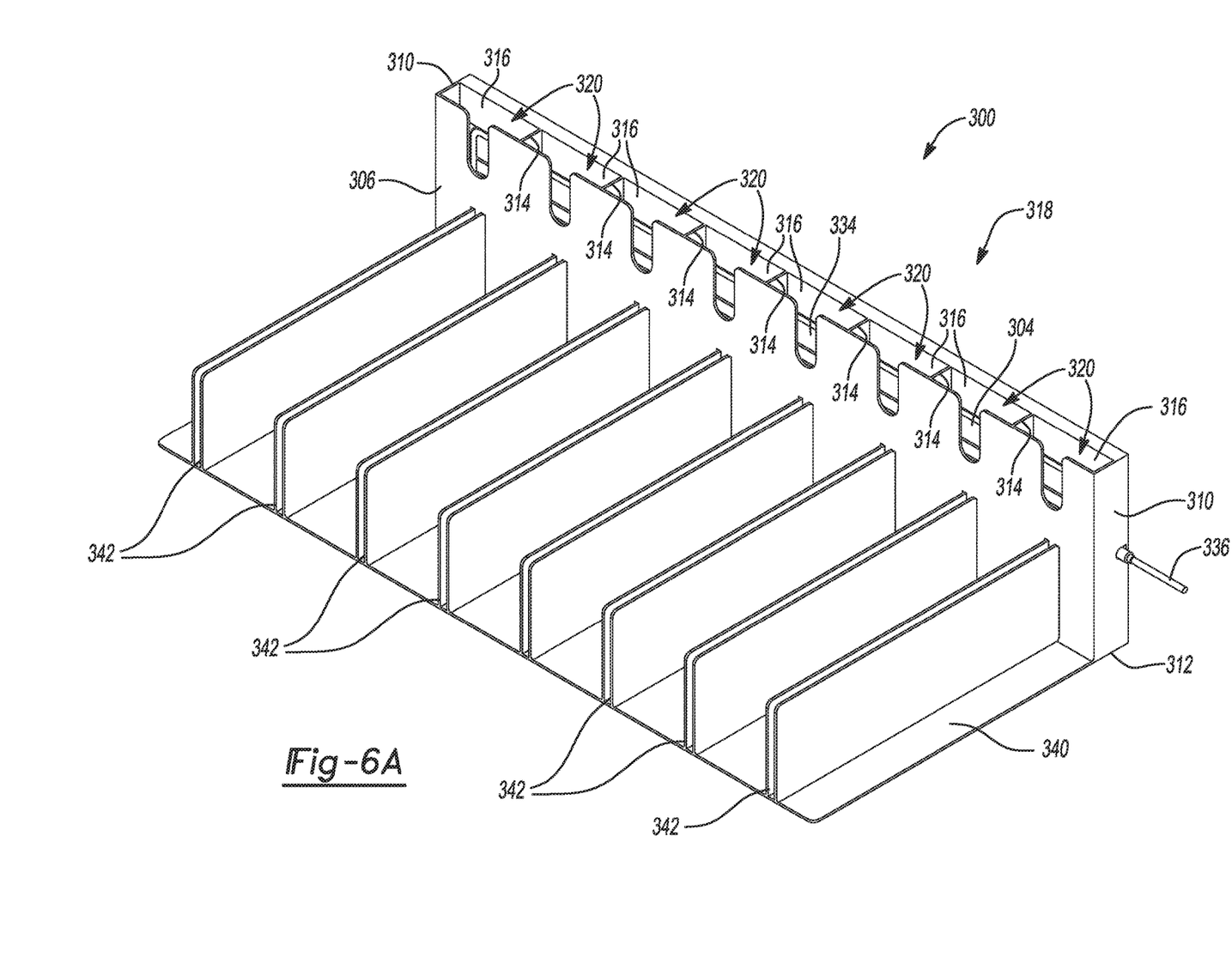
FIG. 6A is a top perspective view of another exemplary housing for portable chargers in accordance with the principles of the present disclosure.
Figure 6B:
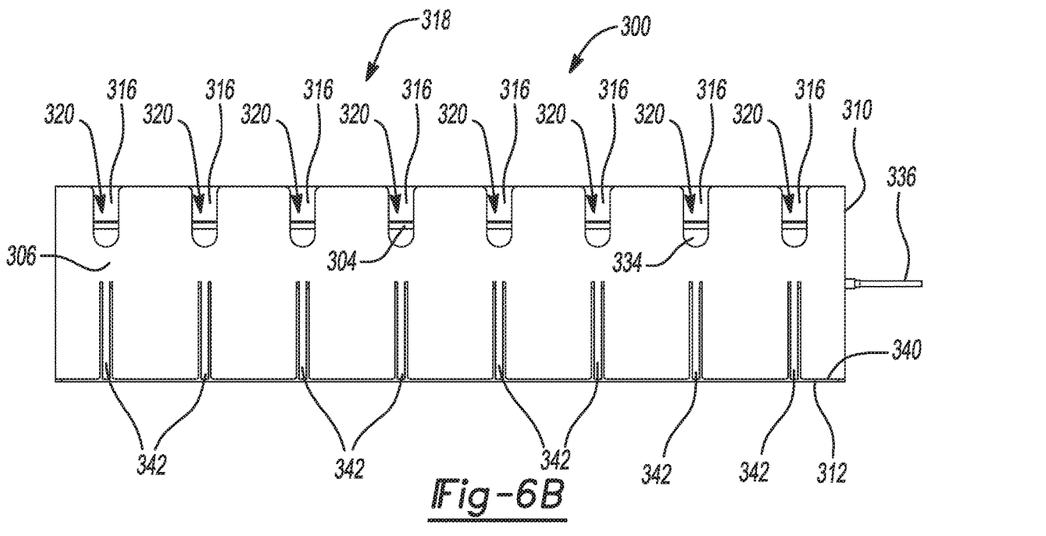
FIG. 6B is a top elevation view of the housing of FIG. 6A.
Figure 6C:
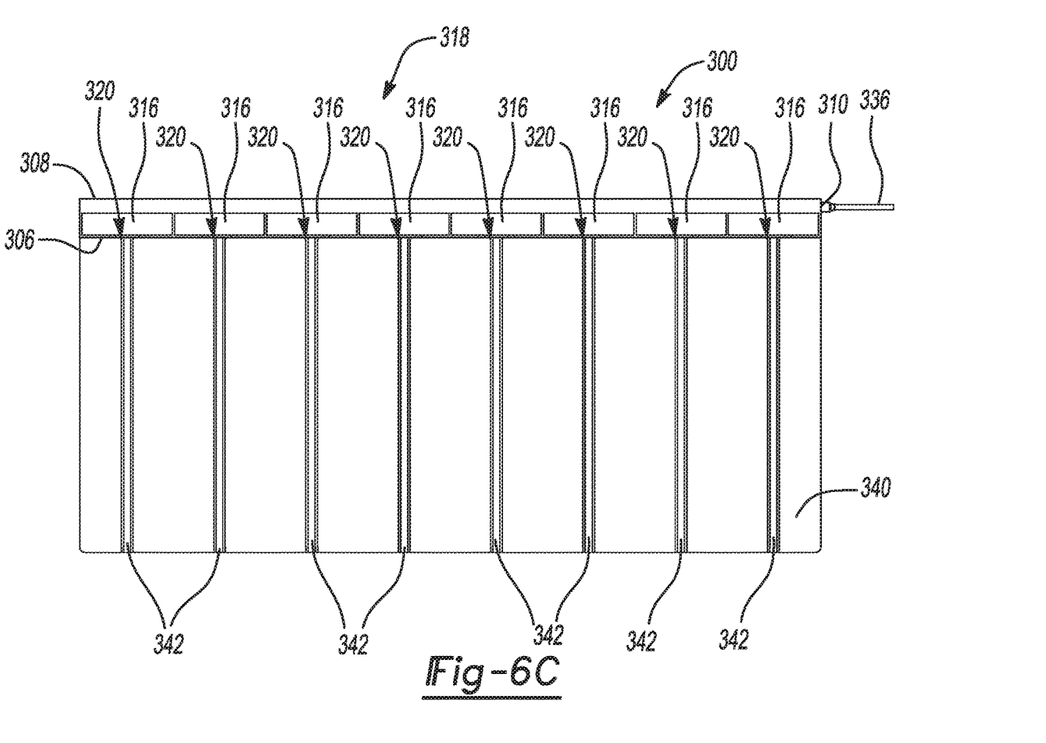
FIG. 6C is a front plan view of the housing of FIG. 6A.
Figure 6D:
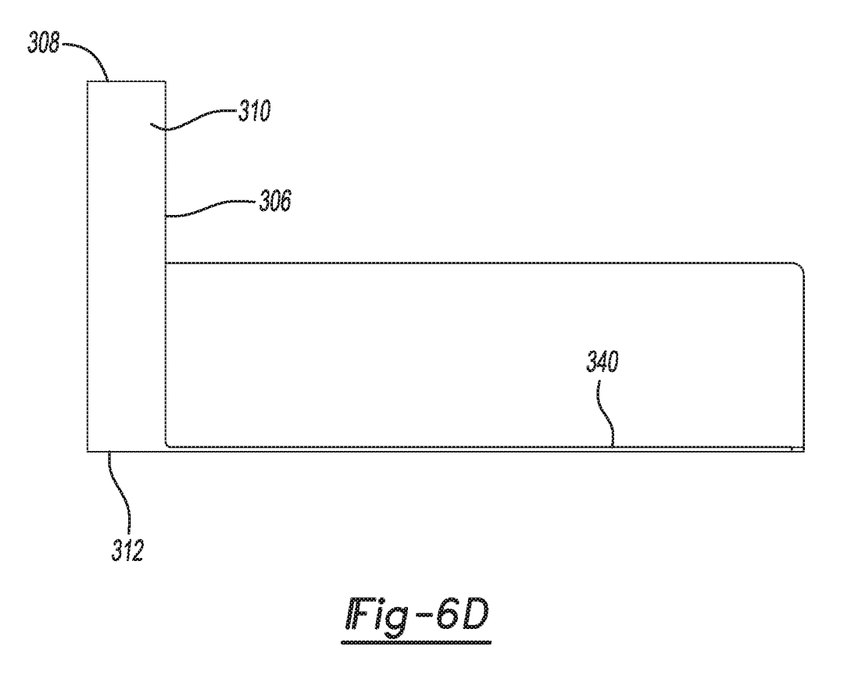
FIG. 6D is a side plan view of the housing of FIG. 6A.

The frame 302 may include a top wall 340 extending from the top portion 106 at approximately a right angle, i.e., perpendicular to a length of the frame 302. The top wall 340 may be substantially flush with the back wall 312 (as shown in FIG. 6D), or the top wall 340 may be offset from the back wall 312. The top wall 340 may include a plurality of slots 342 configured to receive a plurality of electronic devices (not shown). For example, the plurality of electronic devices may include at least one of a smartphone, a laptop computer, a tablet computer, a personal digital assistant, etc. Accordingly, the slots 342 may be sized to receive any suitable electronic device, e.g., any of the electronic devices previously mentioned. In some implementations, each of the slots 342 may include a magnet configured to magnetically retain the electronic devices within the slots 342. In other implementations, the electronic devices are retained within the slots 342 by gravity only. When the electronic devices are disposed in the slots 342 and the power banks 150 are disposed in the compartments 316 and contacting the charging pad 304, the electrical energy flowing through the power cable 336 from the AC receptacle may simultaneously charge the power banks 150 and the electronic devices. In other implementations, the electrical energy may flow through the power banks 150 and into the electronic devices until the electronic devices are fully charged, at which point, the electrical energy may stop being supplied to the electronic devices and the power banks 150 may begin to charge.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A housing for portable chargers, the housing comprising:
   a frame defining a plurality of compartments configured to receive a plurality of portable chargers, the frame comprising:
      a top portion; and
      a bottom portion spaced from the top portion;
   a plurality of retaining members integrally formed with the frame and configured to retain the plurality of portable chargers in the plurality of compartments, wherein the plurality of retaining members are biased toward an unflexed position and flex relative to the top portion of the frame to a flexed position when the plurality of portable charges are inserted into the compartments between the top portion and the bottom portion; and
   a charging pad extending into the plurality of compartments, the charging pad configured to charge the plurality of portable chargers.

2. The housing of claim 1, wherein the charging pad is configured to wirelessly charge the plurality of portable chargers.

3. The housing of claim 1, wherein the plurality of retaining members include a plurality of flexible tabs extending into the plurality of compartments and configured to flex relative to the frame.

4. The housing of claim 1, wherein the frame includes a plurality of dividing walls between the top portion and the bottom portion to define the plurality of compartments.

5. The housing of claim 1, wherein the frame includes a plurality of slots configured to receive a plurality of electronic devices.

6. The housing of claim 5, wherein the plurality of electronic devices includes at least one of a smartphone, a laptop computer, a tablet computer, or a personal digital assistant.

7. A housing for portable chargers, the housing comprising:
   a frame including a top portion, a bottom portion spaced from the top portion, and a plurality of dividing walls between the top portion and the bottom portion to define a plurality of compartments configured to receive a plurality of portable chargers;
   a plurality of retaining members integrally formed with the frame and configured to retain the plurality of portable chargers in the plurality of compartments, wherein the plurality of retaining members are biased toward an unflexed position and flex relative to the top portion of the frame to a flexed position when the plurality of portable charges are inserted into the compartments between the top portion and the bottom portion; and
   a charging pad disposed at the bottom portion and in each compartment of the plurality of compartments, the charging pad configured to charge the plurality of portable chargers.

8. The housing of claim 7, wherein the charging pad is configured to wirelessly charge the plurality of portable chargers.

9. The housing of claim 7, wherein the plurality of retaining members include a plurality of flexible retaining tabs extending into the plurality of compartments and configured to flex relative to the frame.

10. The housing of claim 7, wherein the frame includes a plurality of slots configured to receive a plurality of electronic devices.

11. The housing of claim 10, wherein the plurality of electronic devices includes at least one of a smartphone, a laptop computer, a tablet computer, or a personal digital assistant.

12. A housing configured to simultaneously retain and charge a plurality of portable chargers, the housing comprising:
    a frame defining a plurality of compartments configured to receive a plurality of portable chargers and a plurality of slots configured to receive a plurality of electronic devices, wherein the frame comprises:
       a top portion; and
       a bottom portion spaced from the top portion;
    a plurality of retaining members integrally formed with the frame and configured to retain the plurality of portable chargers in the plurality of compartments, wherein the plurality of retaining members are biased toward an unflexed position and flex relative to the top portion of the frame to a flexed position when the plurality of portable charges are inserted into the compartments between the top portion and the bottom portion; and a charging pad extending into the plurality of compartments, the charging pad configured to charge the plurality of portable chargers.

13. The housing of claim 12, wherein the charging pad is configured to wirelessly charge the plurality of portable chargers.

14. The housing of claim 12, wherein the plurality of retaining members include a plurality of flexible retaining tabs extending into the plurality of compartments and configured to flex relative to the frame.

15. The housing of claim 12, wherein the frame includes a plurality of dividing walls between the top portion and the bottom portion to define the plurality of compartments.

16. The housing of claim 15, wherein the plurality of slots extend from the top portion of the frame in a direction substantially perpendicular to a length of the frame.

17. The housing of claim 12, wherein the plurality of electronic devices includes at least one of a smartphone, a laptop computer, a tablet computer, or a personal digital assistant.

\* \* \* \* \*